United States Patent [19]

Deisler et al.

[11] Patent Number: 4,613,640

[45] Date of Patent: Sep. 23, 1986

[54] TRANSPARENT THERMOPLASTIC ELASTOMERIC COMPOSITIONS AND ARTICLES PRODUCED THEREFROM

[75] Inventors: Richard J. Deisler, Palm Harbor; Eugene P. Goldberg, Tampa, both of Fla.

[73] Assignee: Medical Research Associates, Ltd. #2, Clearwater, Fla.

[21] Appl. No.: 797,651

[22] Filed: Nov. 13, 1985

[51] Int. Cl.⁴ ............................................. C08K 5/24
[52] U.S. Cl. .................................. 524/264; 524/269; 524/490; 524/505
[58] Field of Search ................. 524/264, 269, 490, 505

[56] References Cited

U.S. PATENT DOCUMENTS

| | | | |
|---|---|---|---|
| 4,386,179 | 5/1983 | Sterling | 524/269 |
| 4,481,323 | 11/1984 | Sterling | 524/269 |
| 4,511,354 | 4/1985 | Sterling | 604/98 |

*Primary Examiner*—Joseph L. Schofer
*Assistant Examiner*—N. Sarofin
*Attorney, Agent, or Firm*—Sherman and Shalloway

[57] ABSTRACT

Compositions, including hydrocarbon elastomeric block copolymers, such as styrene-ethylene-butylene-styrene and styrene-butadiene-styrene with mineral oil and essentially linear (i.e. non-cross-linked) polysiloxanes are made transparent by using polysiloxanes which are miscible with mineral oil. A preferred polysiloxane is polymethyloctyl siloxane. Transparent films, bags, tubes and other articles, especially useful in medical applications, such as catheters, blood tubes and blood bags, can be processed from the compositions.

14 Claims, No Drawings

TRANSPARENT THERMOPLASTIC ELASTOMERIC COMPOSITIONS AND ARTICLES PRODUCED THEREFROM

BACKGROUND OF THE INVENTION (1) Field of the Invention

This invention relates to thermoplastic elastomeric compositions which can be fabricated into transparent films, webs, tubes, and other articles. More particularly, this invention relates to a composition of matter composed of a substantially uniform mixture of a thermoplastic elastomeric hydrocarbon block copolymer, mineral oil, and an essentially linear polysiloxane, as well as to the transparent articles, such as articles for medical applications, produced therefrom.

(2) Discussion of Prior Art and Problem To Be Solved

Highly advantageous elastomeric compositions and medical devices, such as medical tubing, are described in U.S. Pat. Nos. 4,386,179 and 4,481,323, both issued to Robert E. Sterling and assigned to Medical Research Associates, Ltd. #2, the assignee of this application. Unlike conventional elastomeric compositions, which are thermosetting in nature, these previously patented compositions are thermoplastic. Some of the principle advantages of these compositions, which have achieved wide commercial success under the "C-Flex" trademark, are their easy processibility, suitability for long term contact with human tissue, flexibility, elasticity, softness, smoothness, tensile strength, and absence of leachable substances. The C-Flex ® compositions are composed of a substantially uniform mixture of a thermoplastic elastomeric hydrocarbon block copolymer, such as styrene-butadiene-styrene, or styrene-ethylenebutylene-styrene, mineral oil and an essentially linear polysiloxane, such as silicone oil, especially dimethylpolysiloxane. More generally, the polysiloxane is described by the following repeating structure:

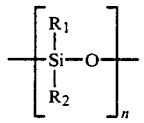

where
$R_1, R_2 = H, CH_3$ or

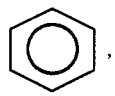

and
n is a positive number between 10 and 20,000.

While the compositions of the above-mentioned Sterling patents and medical tubing products using the patented C-Flex ® compositions have achieved favorable recognition and success in the medical industry in view of their highly favorable properties as described above, these prior compositions all resulted in a somewhat cloudy or milky translucent material. As a result, the C-Flex ® compositions were not totally acceptable for certain medical applications where it was important to be able to see the contents within the containers, tubing, etc. made from the C-Flex ® material. For example, blood tubing, blood bags, transfusion tubing and bags, catheters, etc. are typical of the medical applications for which medical personnel may need to easily and quickly observe the contents within the bag, tubing, etc.

Accordingly, it would be highly desirable to provide compositions retaining all of the favorable characteristics and properties of the C-Flex ® materials while improving their clarity and transparency.

Careful and detailed studies and research by the present inventors have led to the discovery that the cause of the cloudy or milky translucent property was apparently due, at least in part, to the insolubility of the polysiloxane in the mineral oil component. The present invention is based, at least in part, on the discovery that by utilizing polysiloxanes which are miscible in mineral oil in place of the polysiloxanes disclosed in the aforementioned Sterling patents, the compositions will provide clear transparent articles while retaining the other advantageous features and properties of the C-Flex ® compositions.

OBJECTS AND SUMMARY OF THE INVENTION

It is, therefore, an object of this invention to provide novel compositions of matter which are elastomeric thermoplastic hydrocarbon block copolymers incorporating therein mineral oil and polysiloxane which retain the advantageous properties of C-Flex ® and which, in addition, provide clear and transparent articles.

This and other objects of the invention will be further explained and clarified with the assistance of the following detailed description and specific embodiments.

In its broadest aspect, the present invention provides a thermoplastic composition which exhibits improved optical clarity and which is a clear substantially uniform mixture of (A) an elastomeric thermoplastic hydrocarbon block copolymer, (B) mineral oil, and (C) a polysiloxane which is miscible in mineral oil. Correspondingly, the invention provides transparent articles, such as tubing, bags, containers, films, sheets, and the like, especially such articles intended for medical applications, for example, catheters, blood bags, etc.

DETAILED DESCRIPTION AND PREFERRED EMBODIMENTS

As described above, the elastomeric compositions of this invention provide an improvement of the elastomeric compositions as disclosed in the above-mentioned U.S. Pat. Nos. 4,386,179 and 4,481,323, the disclosures of which are incorporated herein in their entirety by reference thereto. The elastomeric compositions of these prior patents will sometimes be referred to herein, for sake of convenience, by the name Original C-Flex ®, while the improved compositions of this invention will sometimes be referred to as Clear C-Flex ®.

In addition to the above-referenced Sterling patents, C-Flex ® compositions and products made therefrom are the subject matter of one other issued United States patent and several pending patent applications, including U.S. Pat. No. 4,511,354—Sterling, and U.S. patent applications Ser. No. 563,825 filed Dec. 21, 1983, now U.S. Pat. No. 4,578,413, to Sterling, Ser. No. 559,685 filed Dec. 9, 1983 to Johnson, Ser. No. 629,819 filed July 11, 1984 to Johnson, and Ser. No. 678,218 filed Dec. 4, 1984, now U.S. Pat. No. 4,552,914, to Sterling, the disclosures of which are incorporated herein by reference thereto.

Since the improved compositions of this invention are essentially the same as the mineral oil-containing compositions of the Sterling patents except for the substitution of the mineral oil miscible polysiloxane component for the immiscible polysiloxane of Original C-Flex ®, a detailed description of the hydrocarbon elastomer, mineral oil, other optional ingredients, and processing conditions need not be provided herein.

Suffice it to say that the elastomeric hydrocarbon block copolymer may typically have an A-B, A-B-A, A-B-A-B-A,

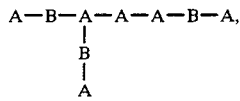

or similar configuration, all as well known in the art, and wherein A preferably takes the form of a monovinyl arene polymer block, of which styrene and styrene derivatives, such as alpha-methylstyrene, can be particularly mentioned, and wherein B takes the form of the elastomeric polymer block, of which polybutadiene and polyisoprene, are especially preferred. The middle B block may be a hydrogenated, partially hydrogenated or non-hydrogenated conjugated diene polymer block. The block copolymer usually has a molecular weight of from 50,000 to 600,000 with the molecular weight of the B block usually falling within the range of from 20,000 to 500,000, preferably 20,000 to 200,000. Styrene-butadiene-styrene (SBS) and styrene-ethylene-butylene-styrene (SEBS) are especially preferred as the elastomeric hydrocarbon block copolymer component of the compositions of this invention.

The block copolymer usually accounts for at least about 30% by weight of the total composition, and up to about 95% by weight, a preferred range being from about 35 to about 65% by weight of the composition. Mixtures of block copolymers can also be used and such mixtures are often preferred where the block copolymers in the mixture differ from each other with respect to the amount of terminal A blocks and middle B block.

Another essential ingredient of the elastomeric composition is mineral oil which, in both the Original C-Flex ® formulation and the Clear C-Flex ® formulation, functions as a rubber or elastomer extender which enhances processing and physical properties. The amount of mineral oil is generally in the range of from about 5 to about 60%, preferably from about 25 to 50%, by weight of the total composition.

According to the present invention, a polysiloxane which is miscible with mineral oil is used as the third essential ingredient. The kinematic viscosity requirement (from about 20 to about 1,000,000, preferably from about 200 to 13,000 centistokes) and concentration (from about 0.1 to 12%, preferably from about 1 to 7%) for the polysiloxane is otherwise the same as in the Original C-Flex ® formulations.

The polysiloxanes which have been found to be miscible with mineral oil are generally characterized by having as one substituent bonded to the silicon atom an alkyl group having at least 3 carbon atoms or an arylalkyl group and the other substituent being alkyl, aryl, or arylalkyl. More particularly, the following general formula (I) can be given for the polysiloxanes which are miscible with mineral oil:

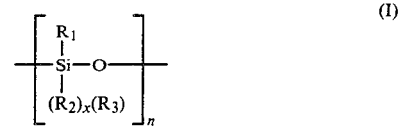

where
$R_1$ is $C_1$–$C_4$ alkyl or

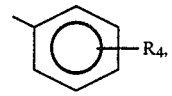

$R_2$ is —$CH_2$—,
$R_3$ is $C_1$–$C_{10}$ alkyl, $C_2$–$C_{10}$ alkenyl, aryl ($C_1$–$C_{10}$) alkyl, or

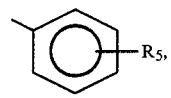

$R_4$ is H, $C_1$–$C_4$ alkyl or $C_2$–$C_4$ alkenyl,
$R_5$ is H, $C_1$–$C_4$ alkyl or $C_2$–$C_4$ alkenyl,
x is 2 or more, provided that when $R_3$ is said alkyl or alkenyl group, x is 3 or more, and
n is a number of from about 10 to about 20,000.

Preferred polysiloxanes of formula (I) are those in which
$R_1$ is methyl or phenyl,
$R_2$ is —$CH_2$—
$R_3$ is $C_1$–$C_8$ alkyl and
x is from 3 to 25, especially from 3 to 20, or $R_3$ is

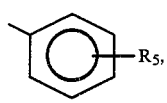

where $R_5$ is as defined above, and
x is from 2 to 5, and
n is a number of from about 10 to about 20,000.
In the above formula, the alkyl and alkenyl groups may be straight or branched.

Specific examples of polysiloxanes are shown in the following Table I. Also shown in Table I is the miscibility of the polysiloxane with mineral oil. The polysiloxane/mineral oil mixture is considered miscible when a stirred mixture at room temperature of one gram polysiloxane and 10 grams mineral oil is visually clear.

TABLE I

Miscibility of Various Polysiloxanes with Mineral Oil

Polysiloxane Used in Test — Polysiloxane Structure:

$$\left[ \begin{array}{c} R_1 \\ | \\ -SiO- \\ | \\ (R_2)_x R_3 \end{array} \right]_n$$

| Polysiloxane Product Name | $R_1$ | $(R_2)_x$ | $R_3$ | Polysiloxane Formula | Mineral Oil/ Polysiloxane Mixture Test Data |
|---|---|---|---|---|---|
| Petrarch PSW2221 Liquid @ 23° C. (devolatilized PS140) | $CH_3$ | $(CH_2)_7$ | $CH_3$ | Polymethyl octyl siloxane | clear |
| Dow Corning 203 Fluid Liquid @ 23° C. | 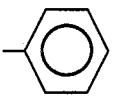 | $(CH_2)_3$ | $C(C_2H_5)_3$ | Polyphenyl 4,4 bisethyl hexyl siloxane (most likely structure) | clear |
| Petrarch PS134 Liquid @ 23° C. | $CH_3$ | $(CH_2)_{13}$ | $CH_3$ | Polymethyl tetra decyl siloxane | clear |
| Petrarch PS132 Liquid @ 23° C. | $CH_3$ | $(CH_2)_5$ | $CH_3$ | Polymethyl hexyl siloxane | clear |
| Admiral Materials Corp. FTR008 Liquid Fluid @ 23° C. | $CH_3$ Copolymer With $CH_3$ | $(CH_2)_7$ H | $CH_3$ | Copolymer of methyloctyl siloxane & polymethyl hydride siloxane | clear |
| Union Carbide L49 Wax @ 23° C. | $CH_3$ | $(CH_2)_{17}$ | $CH_3$ | Polymethyl octyl decyl siloxane | clear |
| Union Carbide L42 Liquid @ 23° C. | $CH_3$ | $(CH_2)_2$ | 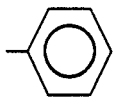 | Polyphenyl ethyl methyl siloxane | clear |
| General Electric SF 1080 Yellow Fluid @ 23° C. | $CH_3$ | $(CH_2)_6$ | 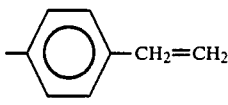—$CH_2$=$CH_2$ | Polymethyl styryl hexyl siloxane | clear |
| Petrarch PS160 | 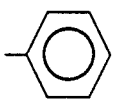 | $CH_3$ | | Polymethyl phenyl siloxane | cloudy |
| Petrarch PS 182 | $CH_3$ | $(CH_2)_2$ | $CF_3$ | Polymethyl 3,3,3 trifluoropropyl siloxane | cloudy |
| Dow Corning 360 Fluid | $CH_3$ | $CH_3$ | | Polydimethyl siloxane | cloudy |

Test Procedure for Mineral Oil/Polysiloxane Miscibility
1. One gram of polysiloxane is added to 10 grams of mineral oil and stirred.
2. Clarity of the mixture is noted.

As a general rule, polysiloxanes which are miscible with mineral oils, as noted by the clarity of the polysiloxane/mineral oil mixture will yield clear compositions with the elastomeric hydrocarbon block copolymers. This can be seen from the results of testing for clarity of several SBS and SEBS formulations with various of the polysiloxanes listed in Table I, with or without mineral oil, as shown in the following Table II.

TABLE II

Clarity Testing of Various Polysiloxanes with SEBS and SBS Block Copolymers and Mineral Oil

| Polysiloxane Used | | Clarity Test Results for SBS, SEBS, Mineral Oil and Polysiloxane Mixtures | | |
|---|---|---|---|---|
| Product Name | Polysiloxane Formula | SEBS & Mineral Oil & Polysiloxane | SBS & Polysiloxane | SBS & Mineral Oil & Polysiloxane |
| Dow Corning 360 Fluid | Polydimethyl siloxane | opaque | opaque | NT |

TABLE II-continued

Clarity Testing of Various Polysiloxanes with
SEBS and SBS Block Copolymers and Mineral Oil Clarity Test Results for SBS, SEBS, Mineral Oil
and Polysiloxane Mixtures

| Polysiloxane Used | | SEBS & Mineral Oil & Polysiloxane | SBS & Polysiloxane | SBS & Mineral Oil & Polysiloxane |
|---|---|---|---|---|
| Product Name | Polysiloxane Formula | | | |
| Petrarch PSW2221 Siloxane | Polymethyl octyl siloxane | clear | translucent | translucent |
| Dow Corning 203 Fluid | Polyphenyl 4,4 bis ethyl hexyl siloxane | NT | clear to translucent | clear to translucent |
| Admiral Materials FT008 | Copolymer of Polymethyl octyl siloxane and Polymethyl hydride siloxane | clear | NT | NT |
| Union Carbide L49 | Polymethyl octyl decyl siloxane | clear | NT | NT |
| Union Carbide L42 | Polyphenyl ethyl methyl siloxane | clear | NT | NT |
| Petrarch PS160 | Polyphenyl methyl | translucent | clear to translucent | clear to translucent |

NT = Not Tested

From the results shown in Table II it can be seen that the more highly saturated SEBS block copolymer has better compatibility and hence higher clarity with the polysiloxanes than does the more highly unsaturated SBS block copolymers, an exception to this general observation being the case of polyphenyl methyl siloxane which provided somewhat clearer mixtures with SBS, with and without mineral oil, than with SEBS.

Examples of several formulations, including an Original C-Flex ® formulation (Run No. 1), and Clear C-Flex ® formulations are shown in the following Table III. Table IV shows the physical properties and appearance of the formulations from Table III.

TABLE III

Formulations and Physical Properties of Various Silicone Fluids and Mineral Oils Mixed With Styrene Ethylene Butylene Block Copolymer or a Styrene Butadiene Styrene Copolymer

| Ingredients | FORMULATIONS Run No. | | | | | | | |
|---|---|---|---|---|---|---|---|---|
| | 1 | 2 | 3 | 4 | 5 | 6 | 7 | 8 |
| Kraton G1651[1] | | 30.4 | 30.4 | 31.4 | | | | |
| Kraton G1650[2] | 7.6 | 7.6 | 7.6 | 7.8 | | | | |
| Finaprene 416[3] | | | | | 79.4 | 79.4 | 98.7 | 98.7 |
| Kaydol 350[4] | 40.0 | 45.0 | 43.0 | 41.3 | 19.0 | | | |
| Drakeol 35[5] | | | | | | 19.3 | | |
| L42 | 4.0 | | | | | | | |
| L49 | | | 1.0 | | | | | |
| PS140 or PSW2221 | | | | 1.9 | 1.0 | | | |
| 360 Fluid | 4.0 | | | | | | | |
| Dow Corning 203 Fluid | | | | | | 0.8 | | 0.8 |
| PS160 | | | | | | | 0.8 | |
| Shell 5520[6] | 3.0 | 3.0 | 3.0 | 3.1 | | | | |
| Shell 5820[7] | 13.0 | 8.0 | 13.0 | 14.4 | | | | |
| Eastman 467DP[8] | 2.0 | 2.0 | 2.0 | 2.0 | | | | |
| Irganox 1010[9] | 0.05 | 0.05 | 0.05 | 0.05 | 0.6 | 0.5 | 0.5 | 0.5 |

TABLE IV

PHYSICAL PROPERTIES OF OPAQUE AND CLEAR FORMULATIONS

| ASTM Test Procedure | Run No. | | | | | | | |
|---|---|---|---|---|---|---|---|---|
| | 1 | 2 | 3 | 4 | 5 | 6 | 7 | 8 |
| Tensile, psi | 1560 | 1420 | 1950 | 2050 | 1730 | 1630 | | 2080 |
| Elongation, % | 890 | 900 | 810 | 820 | 870 | 850 | | 630 |
| Hardness, Shore A | 60 | 50 | 61 | 61 | 49 | 50 | | 70 |
| Light Transmittances,[10] % | close to 0 | | | | 81 | 70 | | 78 |
| Haze % | 100 | | | | 45 | 89 | | 93 |
| Tensile set,[11] % | 100 | 50 | 130 | 135 | 17 | 17 | | 16 |
| Appearance and Comments | opaque to translucent | clear | clear | clear | clear to translu- | clear to translu- | clear | clear to trans- |

TABLE IV-continued

PHYSICAL PROPERTIES OF OPAQUE AND CLEAR FORMULATIONS

| ASTM Test Procedure | Run No. 1 | 2 | 3 | 4 | 5 | 6 | 7 | 8 |
|---|---|---|---|---|---|---|---|---|
| | | | | | cent | cent | | lucent |

[1] SEBS, Shell Oil Co., about 33% styrene block
[2] SEBS, Shell Oil Co., about 28% styrene block
[3] SBS, from Cosden, Inc.
[4] Mineral Oil
[5] Mineral Oil
[6] Polypropylene, Shell Oil Co.
[7] Polypropylene, Shell Oil Co.
[8] Polypropylene, Eastman Chem. Co.
[9] Antioxidant, Ciba-Geigy
[10] ASTM D1003
[11] ASTM D412

The Finaprene 416 styrene-butadiene-styrene block copolymer used in Runs 5–8 as received from the manufacturer had a relatively high concentration of dusting agent which interferred with the light transmittance (clarity) for the formulations of Runs 5, 6 and 8. By treating the Finaprene 416 to remove the dusting agent and other impurities, the clarity is improved in Run 7, even in the absence of mineral oil. However, the composition of Run 7 which does not include mineral oil is less satisfactory in processing and is only difficultly extrudable or moldable. Furthermore, although transparent, the haze values of 89% and 93% for the formulations of Runs 6 and 8 will be unacceptable for those applications where high clarity is required. Haze, which is a measure of the transmitted light which deviates from the original angle of incidence, is acceptable when it does not exceed about 60%, preferably about 50% or less. On the other hand, the degree of light transmittance is considered acceptable when it is at elast about 75%, preferably at least about 80%.

From the data reported in Tables I–IV, the following general conclusions as shown in Table V can be made as to the clarity of formulations of elastomeric hydrocarbon block copolymers as typified by SBS and SEBS block copolymers with mineral oil and polysiloxanes.

TABLE V

Summary of Predicted Clarity for Formulations of Block Copolymers with Mineral Oils and Polysiloxanes Polysiloxane Used in Test
Polysiloxane Structure $$\left[ \begin{array}{c} R_1 \\ | \\ -SiO- \\ | \\ (R_2)_x(R_3) \end{array} \right]_n$$

Clarity Test Results for SEBS, SBS, Mineral Oil & Polysiloxane Mixture

| $R_1$ | $(R_2)_x$ | $R_3$ | SEBS & Mineral Oil & Polysiloxane | SBS & Mineral & Polysiloxane | SBS & Polysiloxane |
|---|---|---|---|---|---|
| $CH_3$ | $(CH_2)_{x>2}$ | $CH_3$ | clear | translucent | translucent |
| $CH_3$ | $CH_3$ | | opaque | — | opaque |
| 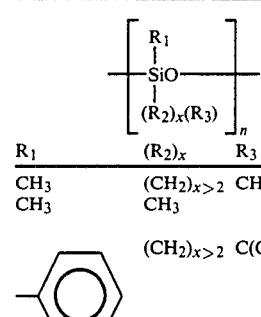 | $(CH_2)_{x>2}$ | $C(C_2H_5)_3$ | — | clear to translucent | clear to translucent |
| $CH_3$ | $(CH_2)_{x>1}$ | 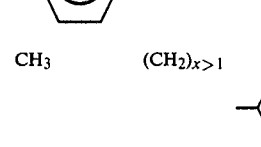 | clear | — | — |
| 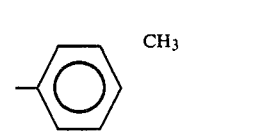 | | $CH_3$ | translucent | clear to translucent | clear to translucent |

The compositions of this invention can include blendable polymers, such as polypropylene, in appropriate amounts, so long as the additives do not impair the light transmittance and haze characteristics. Furthermore, the compounding and processing of the formulations require no modifications but can follow the same procedures as disclosed, for example, in the aforementioned Sterling patents.

The compositions can be extruded into films, sheets, tapes, webs, tubes (both cylindrical and non-cylindrical), etc. or can be molded, e.g. injection molded, compression molded, etc., by conventional and ordinary procedures. Because of their high transparency, the shaped products made from the compositions of this invention can be used with advantage wherever visualization through or into the articles is important. For instance, such medical applications as blood and fluid handling devices where it is important to be able to observe, for examples, bubbles, blood clots, foreign matter, etc., in blood and drain lines, including specifically, intravenous and chemotherapy catheters, dialysis tubing, blood bags, solution bags, and the like, can be mentioned. Wall thicknesses of up to at least about ¼-inch or more can be formed without adversely affecting the clarity.

It is also within the scope of the invention to include transparent dyes in the compositions whereby the clear products can be produced in various color hues to match customer specifications and particular needs.

Where used for medical applications, or food handling applications, or otherwise as necessary, the product made from the compositions of this invention, as well as the compositions, per se, can be sterilized by all conventional methods without introducing traces of contaminants.

As specific examples roller pump tubing with an inside diameter of 0.375 inch and an outside diameter of 0.562 inch is extruded from each of the following formulations A–D:

| Material Components | A | B | C | D |
|---|---|---|---|---|
| Kraton G-1651 (SEBS) | 30.7 | 30.7 | 30.4 | 30.4 |
| Kraton G-1650 (SEBS) | 13.2 | 13.2 | 7.6 | 7.6 |
| Polypropylene #5820 | 5.1 | 5.1 | 13.0 | 8.0 |
| Polypropylene #5520 | — | — | 3.0 | 3.0 |
| Polypropylene #4G7 DP | 3.1 | 3.1 | 2.0 | 2.0 |
| Octylmethyl Polysiloxane fluid (PSW2221 - Petrarch Systems, Inc.) | 2.0 | 1.0 | 2.0 | 1.0 |
| Mineral Oil | 45.9 | 46.9 | 43.0 | 48.0 |
| Irganox 1010 | — | — | — | 0.05 |

In each case, tubes having clarity suitable for use in transporting blood in blood oxygenation machines are provided.

What is claimed is:

1. A thermoplastic composition which exhibits improved optical clarity comprising a substantially uniform mixture of
   (A) an elastomeric thermoplastic hydrocarbon block copolymer in an amount of at least about 30% of the total weight of the composition;
   (B) mineral oil in an amount of from about 5 to about 60% by weight of the composition; and
   (C) a polysiloxane which is miscible with mineral oil and which has a viscosity within the range of from about 20 to about 1,000,000 centistokes at room temperature in an amount of from about 0.1 to 12%, by weight, of the composition.

2. The composition of claim 1 wherein the polysiloxane has the formula

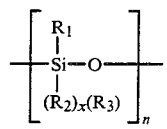

where $R_1$ is $C_1$–$C_4$ alkyl or

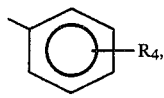

$R_2$ is —$CH_2$—,
$R_3$ is $C_1$–$C_{10}$ alkyl, $C_2$–$C_{10}$ alkenyl, aryl ($C_1$–$C_{10}$) alkyl, or

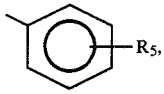

$R_4$ is H, $C_1$–$C_4$ alkyl or $C_2$–$C_4$ alkenyl,
$R_5$ is H, $C_1$–$C_4$ alkyl or $C_2$–$C_4$ alkenyl,
x is 2 or more, provided that when $R_3$ is said alkyl or alkenyl group, x is 3 or more, and
n is a number of from about 10 to about 20,000.

3. The composition of claim 2 wherein
$R_1$ is methyl or phenyl,
$R_2$ is —$CH_2$—,
$R_3$ is $C_1$–$C_8$ alkyl and
x is from 3 to 25, or
$R_3$ is

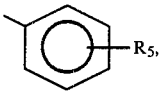

where $R_5$ is as defined above, and
x is from 2 to 5, and
n is a number of from about 10 to about 20,000.

4. The composition of claim 1 wherein the polysiloxane is selected from the group consisting of polymethyl octyl siloxane, polyphenyl-4,4-bisethyl hexyl siloxane, polymethyltetradecyl siloxane, polymethyl hexyl siloxane, a copolymer of methyloctyl siloxane and methylhydride siloxane, polymethyl octyldecyl siloxane, polyphenylethyl methyl siloxane, and polymethyl styryl hexyl siloxane.

5. The composition of claim 1 wherein the block copolymer comprises styrene-butadiene-styrene.

6. The composition of claim 1 wherein the block copolymer comprises styrene-ethylene-butylene-styrene.

7. The composition of claim 1 which further comprises polypropylene.

8. The composition of claim 7 wherein the polypropylene comprises from about 2 to 20 percent by weight of the composition.

9. A transparent article obtained by processing the composition of claim 1.

10. The transparent article of claim 9 in the form of a tube.

11. The transparent article of claim 9 in the form of a film.

12. The transparent article of claim 9 in the form of a flexible container.

13. The transparent article of claim 9 wherein the processing is extrusion.

14. The transparent article of claim 9 wherein the processing is molding.

* * * * *

UNITED STATES PATENT AND TRADEMARK OFFICE
CERTIFICATE OF CORRECTION

PATENT NO. : 4,613,640

DATED : September 23, 1986

INVENTOR(S) : Richard J. Deisler, Et Al.

It is certified that error appears in the above-identified patent and that said Letters Patent is hereby corrected as shown below:

Column 9, line 64, delete "elast", insert --least--.

Signed and Sealed this

Twenty-fourth Day of February, 1987

*Attest:*

DONALD J. QUIGG

*Attesting Officer*   *Commissioner of Patents and Trademarks*